US012314071B2

(12) United States Patent
Joshi et al.

(10) Patent No.: US 12,314,071 B2
(45) **Date of Patent: *May 27, 2025**

(54) CURRENT-MODE FEEDFORWARD RIPPLE CANCELLATION

(71) Applicant: TEXAS INSTRUMENTS INCORPORATED, Dallas, TX (US)

(72) Inventors: Kishan Joshi, Tucson, AZ (US); Sanjeev Manandhar, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,066

(22) Filed: Sep. 5, 2023

(65) Prior Publication Data

US 2023/0409060 A1 Dec. 21, 2023

Related U.S. Application Data

(63) Continuation of application No. 17/981,557, filed on Nov. 7, 2022, now Pat. No. 11,782,468, which is a continuation of application No. 17/139,500, filed on Dec. 31, 2020, now Pat. No. 11,531,361.

(60) Provisional application No. 63/004,334, filed on Apr. 2, 2020.

(51) Int. Cl.
*G05F 1/56* (2006.01)

(52) U.S. Cl.
CPC ...................................... *G05F 1/56* (2013.01)

(58) Field of Classification Search
None
See application file for complete search history.

(56) References Cited

U.S. PATENT DOCUMENTS

| | | |
|---|---|---|
| 6,541,946 B1 | 4/2003 | Chen |
| 7,106,033 B1 | 9/2006 | Liu |
| 7,714,551 B2 | 5/2010 | Fan |

(Continued)

FOREIGN PATENT DOCUMENTS

| | | |
|---|---|---|
| EP | 1439444 A1 | 7/2004 |
| WO | 2019157991 A1 | 8/2019 |

OTHER PUBLICATIONS

Extended European Search Report; Application No./Patent No. 21781349.2-1012/42128505 PCT/US2021024569; dated:Sep. 11, 2023.

(Continued)

*Primary Examiner* — Thomas J. Hiltunen
(74) *Attorney, Agent, or Firm* — Charles F. Koch; Frank D. Cimino

(57) ABSTRACT

In an example, an apparatus includes an error amplifier, a buffer, a transistor, and a current-mode feedforward ripple canceller (CFFRC). The error amplifier has an amplifier output, a first input, and a second input, the error amplifier second input configured to receive a reference voltage. The buffer has a buffer input and a buffer output, the buffer input coupled to the error amplifier output. The transistor has a gate, a source, and a drain, the gate coupled to the buffer output, the drain coupled to the first input. The transistor is configured to receive an input voltage (VIN) at the source and provide an output voltage at the drain. The CFFRC has a CFFRC input and a CFFRC output, the CFFRC output coupled to the gate, and the CFFRC input configured to receive VIN.

14 Claims, 7 Drawing Sheets

(56) References Cited

U.S. PATENT DOCUMENTS

| | | | | |
|---|---|---|---|---|
| 7,750,729 | B2 | 7/2010 | Lee | |
| 7,863,881 | B2 | 1/2011 | Inoue | |
| 8,854,023 | B2 | 10/2014 | Ock | |
| 9,007,045 | B2 | 4/2015 | Terada | |
| 9,552,006 | B1 | 1/2017 | Gorecki | |
| 9,577,508 | B2 | 2/2017 | Wang | |
| 9,785,164 | B2 | 10/2017 | Aboudina | |
| 9,921,593 | B2 | 3/2018 | Gorecki | |
| 10,254,777 | B2 | 4/2019 | Duong | |
| 11,146,217 | B2 | 10/2021 | Hu | |
| 11,531,361 | B2 | 12/2022 | Joshi | |
| 11,782,468 | B2 * | 10/2023 | Joshi | G05F 1/575 323/273 |
| 2008/0157735 | A1 | 7/2008 | Liu | |
| 2008/0218139 | A1 | 9/2008 | Takagi | |
| 2014/0340058 | A1 | 11/2014 | Wang | |
| 2017/0126118 | A1 | 5/2017 | Duong | |
| 2019/0113942 | A1 * | 4/2019 | Murukumpet | G05F 1/575 |
| 2020/0012303 | A1 | 1/2020 | Stanzione | |
| 2022/0091622 | A1 | 3/2022 | Gurun | |

OTHER PUBLICATIONS

Alon et al., "Replica Compensated Linear Regulators for Supply-Regulated Phase-Locked Loops," IEEE Journal of Solid-State Circuits, vol. 41, No. 2, Feb. 2006, pp. 413-424.
El-Nozahi et al., "A 25mA 0.13 μm CMOS LDO Regulator with Power-Supply Rejection Better Than -56dB up to 10 MHz Using a Feedforward Ripple-Cancellation Technique," ISSCC 2009, Session 19, Analog Techniques, 19.5, 3 p.
El-Nozahi et al., "High PSR Low Drop-Out Regulator With Feed-Forward Ripple Cancellation Technique," IEEE Journal of Solid-State Circuits, vol. 45, No. 3, Mar. 2010, pp. 565-577.
G. A. Rincon-Mora, "Analog IC Design with Low-Dropout Regulators," 2nd Edition: McGraw-Hill Education, 2014, pp. 212-219.
Guo et al., "A 101 dB PSRR, 0.0027% THD +N and 94% Power-Efficiency Filterless Class D Amplifier," IEEE Journal of Solid-State Circuits, vol. 49, No. 11, Nov. 2014, pp. 2608-2617.
Ho et al., "Wide-Loading-Range Fully Integrated LDR With a Power-Supply Ripple Injection Filter," IEEE Transactions on Circuits and Systems-II: Express Briefs, vol. 59, No. 6, Jun. 2012, pp. 356-360.
Ingino et al., "A 4-GHz Clock System for a High-Performance System-on-a-Chip Design," IEEE Journal of Solid-State Circuits, vol. 36, No. 11, Nov. 2001, pp. 1693-1698.
Jiang et al., "A 65-nm CMOS Low Dropout Regulator Featuring >60-dB PSRR Over 10-MHz Frequency Range and 100-mA Load Current Range," IEEE Journal of Solid-State Circuits, vol. 53, No. 8, Aug. 2018, pp. 2331-2342.
Kruiskamp et al., "Low Drop-Out Voltage Regulator with Full On-Chip Capacitance for Slot-Based Operation," SiTel Semiconductor, pp. 346-349.
Kwok et al., "Pole-Zero Tracking Frequency Compensation for Low Dropout Regulator," pp. IV-735-IV-738.
Lim et al., "An External Capacitorless Low-Dropout Regulator With High PSR at All Frequencies From 10 KHz to 1 GHz Using an Adaptive Supply-Ripple Cancellation Technique," IEEE Journal of Solid-State Circuits, vol. 53, No. 9, Sep. 2018, pp. 2675-2685.
Lu et al., "An NMOS-LDO Regulated Switched-Capacitor DC-DC Converter With Fast-Response Adaptive-Phase Digital Control," IEEE Transactions on Power Electronics, vol. 31, No. 2, Feb. 2016, pp. 1294-1303.
Magod et al., "A 1.24 μA Quiescent Current NMOS Low Dropout Regulator With Integrated Low-Power Oscillator-Driven Charge-Pump and Switched-Capacitor Pole Tracking Compensation," IEEE Journal of Solid-State Circuits, vol. 53, No. 8, Aug. 2018, pp. 2356-2367.
Magod et al., "A 14.8 μ Vrms Integrated Noise Output Capacitor-less Low Dropout Regulator with a Switched-RC Bandgap Reference," Copyright 2015 IEEE, 4 p.
Maxim Integrated Products, Inc., "Selecting LDO Linear Regulators for Cellphone Designs," Copyright Oct. 1, 2002, 3 p.
Mulligan et al., "A 3MHz Low-Voltage Buck Converter with Improved Light Load Efficiency," ISSCC 2007, Session 29, Analog and Power Management Techniques, 3 p.
Park et al., "External Capacitor-Less Low Drop-Out Regulator With 25 dB Superior Power Supply Rejection in the 0.4-4 MHz Range," IEEE Journal of Solid-State Circuits, vol. 49, No. 2, Feb. 2014, pp. 486-501.
Patel et al., "High Power-Supply-Rejection (PSR) Current-Mode Low-Dropout (LDO) Regulator," IEEE Transactions on Circuits and Systems-II: Express Briefs, vol. 57, No. 11, Nov. 2010, pp. 868-873.
Peng et al., "A Power-Efficient Reconfigurable Output-Capacitor-Less Low-Drop-Out Regulator for Low-Power Analog Sensing Front-End," IEEE Transactions on Circuits and Systems-1: Regular Papers, vol. 64, No. 6, Jun. 2017, pp. 1318-1327.
Shi et al., "A Highly Integrated Power Management IC for Advanced Mobile Applications," IEEE 2006 Custom Integrated Circuits Conference (CICC), pp. 85-88.
Wong et al., "A 150mA Low Noise, High PSRR Low-Dropout Linear Regulator in 0.13 μm Technology for RF SoC Applications," Wireless Analog Technology Center, Texas Instruments, Copyright 2006 IEEE, pp. 532-535.
Yang et al., "A High-PSR LDO using a Feedforward Supply-Noise Cancellation Technique," Copyright 2011 IEEE, 4 p.
Yuk et al., "PSR Enhancement Through Super Gain Boosting and Differential Feed-Forward Noise Cancellation in a 65-nm CMOS LDO Regulator," IEEE Transactions on Very Large Scale Integration (VLSI) Systems, vol. 22, No. 10, Oct. 2014, pp. 2181-2191.
Search Report for PCT Patent Application No. PCT/US2021/024569, date of mailing of the international search report Jun. 17, 2021, 1 page.
EP1439444A1, English Machine Translation, 13 pages.

* cited by examiner

400

600

700

CURRENT-MODE FEEDFORWARD RIPPLE CANCELLATION

CROSS-REFERENCE TO RELATED APPLICATION

This application is a continuation of U.S. patent application Ser. No. 17/981,557, filed on Nov. 7, 2022, which is a continuation of U.S. patent application Ser. No. 17/139,500, filed on Dec. 31, 2020, now U.S. Pat. No. 11,531,361, which claims priority to U.S. Provisional Patent Application No. 63/004,334, which was filed Apr. 2, 2020, all of which are hereby incorporated herein by reference in their entirety.

BACKGROUND

A low dropout regulator (LDO) is a direct-current (DC) linear voltage regulator that regulates an output voltage (VOUT) based on an input voltage (VIN). If VIN is greater in value than a reference voltage (VREF) that indicates a programmed regulation point for VOUT, then the LDO regulates VIN down to provide VOUT. An LDO can be used as a filtering device following a switching regulator to condition a signal before that signal is provided to a load. VIN can include signal noise or other variations in value, and a power supply rejection (PSR) ratio of the LDO may determine an ability of the LDO to suppress this noise or other variations in value of VOUT.

SUMMARY

In an example, an apparatus includes an error amplifier, a buffer, a transistor, and a current-mode feedforward ripple canceller (CFFRC). The error amplifier has an amplifier output, a first input, and a second input, the second input configured to receive a reference voltage (Vref). The buffer has a buffer input and a buffer output, the buffer input coupled to the amplifier output. The transistor has a gate, a source, and a drain, the gate coupled to the buffer output, the drain coupled to the first input. The transistor is configured to receive an input voltage (VIN) at the source and provide an output voltage (VOUT) at the drain. The CFFRC has a CFFRC input and a CFFRC output, the CFFRC output coupled to the gate, and the CFFRC input configured to receive VIN.

In an example, an apparatus includes a transistor, an error amplifier, a buffer, and a CFFRC. The transistor has a gate, a source, and a drain, the source configured to receive VIN. The error amplifier is configured to compare VOUT at the drain to Vref and provide an error signal responsive to the comparison. The buffer is configured to provide the error signal to the gate. The CFFRC is configured to, sense a voltage ripple in VIN, convert the sensed voltage ripple to a current representation of the voltage ripple, and provide the current representation of the voltage ripple to the gate.

In an example, a system includes a load and a low dropout regulator (LDO). The LDO is adapted to be coupled to the load and is configured to provide a regulated VOUT to the load based on VIN. The LDO includes a transistor, an error amplifier, a buffer, and a CFFRC. The transistor has a gate, a source, and a drain, the source configured to receive VIN. The error amplifier is configured to compare VOUT at the drain to Vref and provide an error signal responsive to the comparison. The buffer is configured to provide the error signal to the gate. The CFFRC is configured to sense a voltage ripple in VIN, convert the sensed voltage ripple to a current representation of the voltage ripple, provide the current representation of the voltage ripple to the gate.

DETAILED DESCRIPTION

Figure 1:
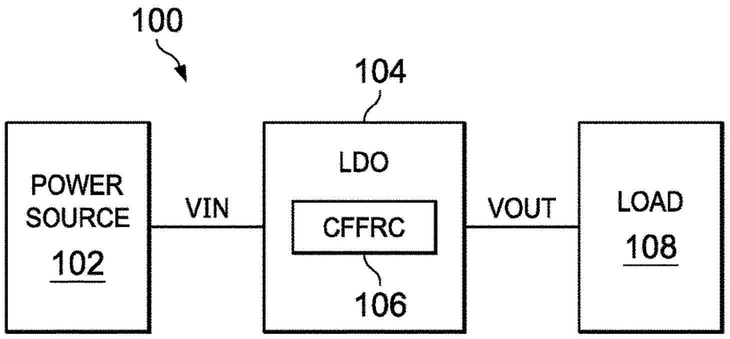
FIG. 1 is a block diagram of an example system.

In a low dropout regulator (LDO), it may be advantageous to have a high power supply rejection (PSR) ratio across a wide range of frequencies (e.g., such as a PSR of greater than about 45 decibels (dB) across a frequency range of about 2 megahertz (MHz)). A high PSR across a wide range of frequencies may enable the LDO to be suitable for implementation in multiple applications, such as following a switching regulator that may provide an input voltage (VIN) having high frequency or low frequency noise, and to provide an output voltage (VOUT) to components that may be noise sensitive, such as system-on-chip (SOC), sensor modules, low solution size power systems, and other noise sensitive circuits (such as radio frequency (RF) circuits, analog-to-digital converters (ADCs), phase locked loops (PLLs), etc.). Some LDO topologies may provide PSR within their loop-bandwidth. However, their PSR performance degrades with reduced loop gain outside their loop-bandwidth. LDOs with external filtering capacitors may have spectral peaking in their PSR response, causing increased system level supply noise. Also, large capacitors for improving PSR response may increase quiescent power consumption of an LDO, and increase a silicon surface area consumed by an LDO, which may increase cost of the LDO.

Aspects of this description relate to an LDO having a wide frequency, high PSR rate. For example, at least one implementation of an LDO according to this description achieves a PSR of greater than 68 dB for frequencies up to 2 MHz, and over a range of load current from about 100 microamps (A) up to about 250 milliamps (mA). For at least some frequencies, this is an improvement or increase in PSR of up to about 25 dB over other techniques. In at least some implementations, the above performance is achieved via a current-mode approach that does not use a summing amplifier to provide the PSR. At least one example of an LDO includes a current-mode feedforward ripple canceller (CFFRC). A feedforward path of the LDO that includes the CFFRC may be gain matched to a forward gain of the LDO. Accordingly, for at least some implementations, the CFFRC may be implemented without specific calibration to the LDO.

In at least some implementation environments, an LDO that includes a p-type pass device, such as a p-type transistor, p-type field effect transistor (PFET), or p-type metal oxide semiconductor (PMOS) FET, may be implemented without including a charge pump to provide a drive signal to a gate of the p-type pass device. In contrast, an LDO that includes a n-type pass device (e.g., NFET) may use a charge pump to provide a drive signal to a gate of the n-type pass device. A charge pump may increase quiescent current consumption of the LDO. Accordingly, it may be advantageous in some circumstances to use an LDO with a p-type pass device rather than an n-type pass device, such as in LDO applications in which a low quiescent current may be advantageous. For robust PSR performance, semiconductor physics may dictate that an n-type pass device may use a constant voltage on a gate of the pass device, and a p-type pass device may use a supply voltage ripple replicated on a gate of the pass device, such as resulting from its operation in a common source configuration. In at least some examples, the CFFRC of the LDO in this description is configured to replicate a supply ripple of an input voltage VIN received by the LDO to a gate of a p-type pass device of the LDO. The CFFRC may replicate the ripple to the gate of the pass device in a manner independent of ripple frequency, and without using a summing amplifier, as described above.

FIG. 1 is a diagram of an example system 100. At least some implementations of the system 100 are representative of an application using an LDO including a CFFRC, as described above. In at least some examples, the system 100 includes a power source 102, an LDO 104 that includes a CFFRC 106, and a load 108. The LDO 104 may be coupled between the power source 102 and the load 108 and configured to provide a regulated VOUT to the load 108, based on an input voltage VIN received from the power source 102. In some examples, VIN includes noise or other variations in value. For example, the power source 102 may be any suitable source of power for the LDO 104, such as a battery, a switching power converter (such as a switched mode power supply), a transformer, etc. that may provide VIN to the LDO 104 having some amount of noise or other variation in value.

In at least some examples, the load 108 is noise sensitive, or includes one or more components that are noise sensitive. Thus, in at least some such examples, it may be advantageous for the LDO 104 to have a high PSR ratio for suppressing the noise or other variation in VIN to mitigate appearance of the noise or other variation in VOUT. To at least partially mitigate passing of the noise of VIN to the load 108 in VOUT, the CFFRC 106 may detect and replicate the noise onto a gate of a pass device (not shown) of the LDO 104, increasing PSR of the LDO 104, and thereby increasing an amount of VIN noise that is suppressed against being in VOUT.

Figure 2:
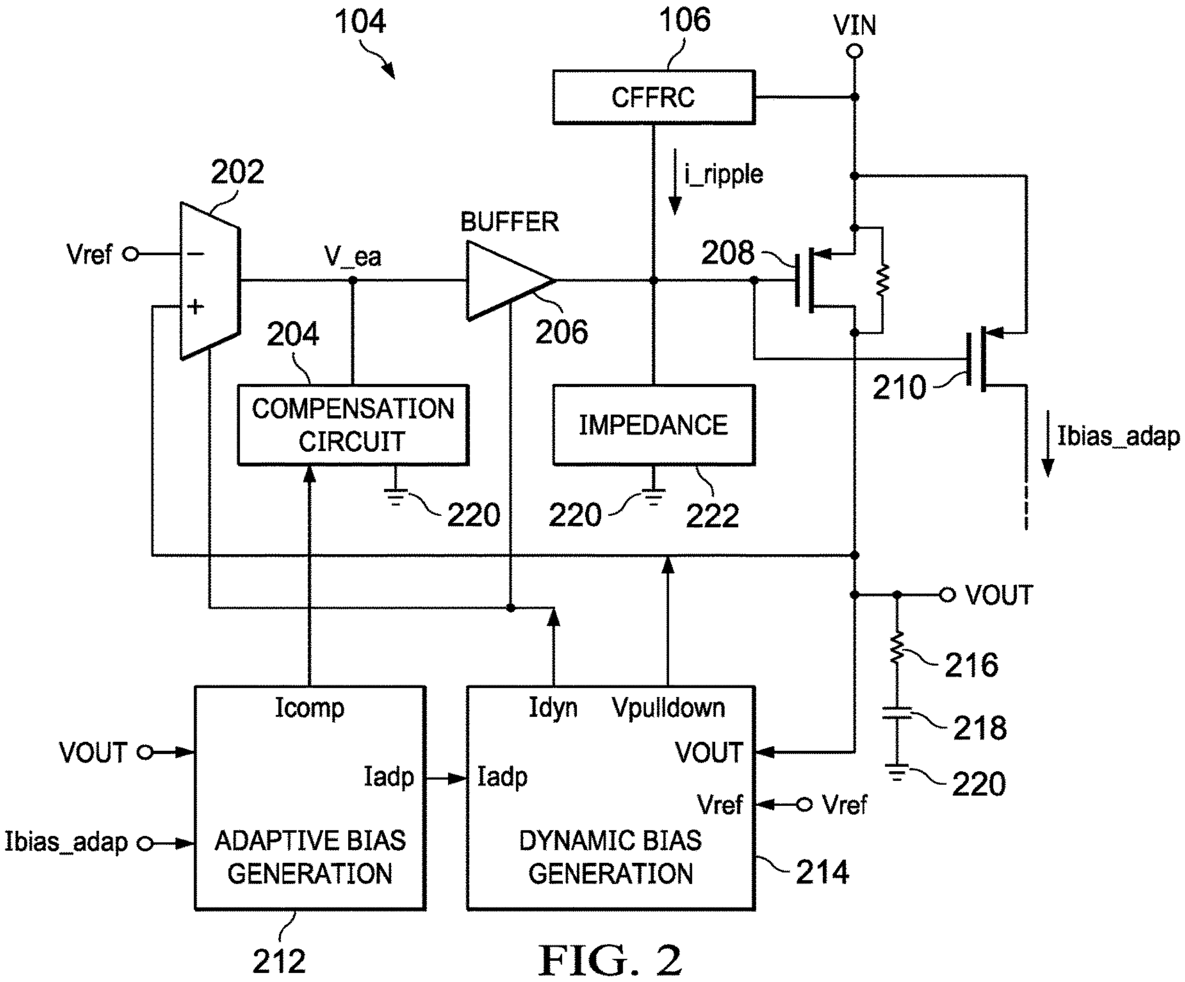
FIG. 2 is a block diagram of an example implementation of the low dropout regulator (LDO).

FIG. 2 is a block diagram of an example implementation of the LDO 104. In at least some examples, the LDO 104 includes the CFFRC 106, an error amplifier 202, a compensation circuit 204, a buffer 206, a pass FET 208, a current sense FET 210, an adaptive bias generation circuit 212, and a dynamic bias generation circuit 214. In at least some examples, the LDO 104 is adapted to be coupled to one or more components at an output of the LDO 104, such as a resistor 216 and/or a capacitor 218. The error amplifier 202 may be any suitable operational transconductance amplifier (OTA), the scope of which is not limited herein.

In an example architecture of the LDO 104, the error amplifier 202 has a first input (e.g., a positive or non-inverting input) coupled to a drain of the pass FET 208, a second input (e.g., a negative or inverting input) configured to receive a reference voltage (Vref), and an output. The compensation circuit 204 is coupled between the output of the error amplifier 202 and ground 220. In at least some examples, the compensation circuit 204 includes one or more passive components (not shown), such as capacitors and/or resistors, which may filter or otherwise provide compensation to an error amplifier output signal (V_ea) from the output of the error amplifier 202. The buffer 206 has an input coupled to the output of the error amplifier 202, and an output coupled to a gate of the pass FET 208. The CFFRC 106 has an input coupled to a source of the pass FET 208 and is configured to receive VIN. The CFFRC 106 has an output coupled to the gate of the pass FET 208. In at least some examples, an impedance may be provided at the output of the buffer 206. This is shown in the LDO 104 as impedance 222 coupled between the output of the buffer 206 and ground 220. However, in at least some examples, the impedance 222 may not be a physical component. Instead, the impedance 222 may be representative of an output impedance that is inherent to, and provided at the output of, the buffer 206. The current sense FET 210 has a source coupled to the source of the pass FET 208, a gate coupled to the gate of the pass FET 208, and a drain coupled to an input of the adaptive bias generation circuit 212. The adaptive bias generation circuit 212 has a first output coupled to the compensation circuit 204, and a second output coupled to a first input of the dynamic bias generation circuit 214. The dynamic bias generation circuit 214 has a first output coupled to bias inputs of the error amplifier 202 and the buffer 206. A second output is coupled to the first input of the error amplifier 202, a second input is configured to receive Vref, and a third input is coupled to the drain of the pass FET 208. In at least some examples, an output of the LDO 104 (at which the output voltage VOUT is provided) is the drain of the pass FET 208. In at least some examples, the resistor 216 and the capacitor 218 may be coupled in series between the drain of the pass FET 208 and ground 220. In at least some examples, the capacitor 218 may be an off-chip capacitor to which the LDO 104 is adapted to be coupled, and which sets a dominant pole in a frequency response of VOUT, which is provided by the LDO 104. Although not shown in FIG. 2, in at least some examples a resistor divider is coupled between the drain of the pass FET 208 and ground 220, and the first input of the error amplifier 202 is coupled to an output of the resistor divider instead of directly to the drain of the pass FET 208.

In an example operation of the LDO 104, VIN is received and passed by the pass FET 208, so the LDO 104 may provide VOUT. The pass FET 208 passes VIN (for providing VOUT) based on a value of a signal received at the gate of the pass FET 208. An amount of current flowing through the pass FET 208 is related to a value of the signal received at the gate of the pass FET 208. So, a larger value signal at the gate of the pass FET 208 (such as causing a lager gate-to-source voltage differential of the pass FET 208) may result in VOUT having a value nearer VIN. To provide the signal at the gate of the pass FET 208, the error amplifier 202 compares VOUT to Vref and provides V_ea having a value that indicates a difference between VOUT and Vref. In some implementations, the error amplifier 202 is a folded cascode operational transconductance amplifier (OTA) based error amplifier that may be biased with a combination of a static bias current (e.g., in no load operation) and adaptive or dynamic biasing (e.g., for transient and high load current operation), such as provided by the adaptive bias generation circuit 212 and/or the dynamic bias generation circuit 214, as described below. In at least some examples, compensation is provided to V_ea by the compensation circuit 204, such as under control of the adaptive bias generation circuit 212. The buffer 206 has an input coupled to the output of the error amplifier 202, and has an output coupled to the gate of the pass FET 208.

In at least some examples, the CFFRC 106 also provides a signal to the gate of the pass FET 208. For example, the CFFRC 106 may sense a voltage ripple in VIN, convert the voltage ripple to a current representative of the voltage ripple, indicated as i_ripple, and provide i_ripple to the gate of the pass FET 208. The current of i_ripple and the current provided by the buffer 206 are summed at the gate of the pass FET 208 and have a voltage determined at least partially by impedance 222. In at least some examples, this mirrors the voltage ripple of VIN to the gate of the pass FET 208, increasing the PSR ratio of the LDO 104. For example, voltage ripple in the signal provided at the gate of the pass FET 208 may be approximately equal to VIN ripple multiplied by a ratio of transconductance of the CFFRC 106 to transconductance of the buffer 206. By matching transistor level characteristics of at least some components of the buffer 206 and the CFFRC 106, the ratio may be controlled to be 1, thereby causing the voltage ripple in the signal provided at the gate of the pass FET 208 to be approximately equal to the VIN ripple. Responsive to the ratio being controlled to be 1, VOUT of the LDO 104 may be approximately equal to (gain/(1+gain))*Vref, where gain is the closed loop gain of the LDO 104. Having this ripple as a common mode input to both the gate and source of the pass FET 208 may reduce an amount of the ripple that is coupled by the pass FET 208 onto the drain of the pass FET 208, which (as described above) is the output of the LDO 104. In that way, the PSR ratio of the LDO 104 is increased. In at least some examples, the PSR ratio of the LDO 104 is increased without using a voltage summing amplifier, thereby resulting in reduced quiescent current of the LDO 104. For example, at least some implementations of the LDO 104 have a no-load quiescent current of about 5.6 microamps (uA).

In at least some examples, the current sense FET 210 is a scaled replica of the pass FET 208, and a current flowing through the current sense FET 210 (indicated as Ibias_adap) is provided to the adaptive bias generation circuit 212. In at least some implementations, the adaptive bias generation circuit 212 implements a 1:M sense FET based architecture with a sense ratio of about 1:12000 (e.g., the sense FET 210 has a size approximately 12000 times a size of the pass FET 208). Based on Ibias_adap, the adaptive bias generation circuit 212 may change the bandwidth of components of the LDO 104, such as the compensation circuit 204 and/or the dynamic bias generation circuit 214. For example, based on Ibias_adap, the adaptive bias generation circuit 212 may provide a compensation current (Icomp) to the compensation circuit 204 to control (or bias) the compensation circuit 204. The compensation circuit 204 may implement a pole-zero tracking compensation technique, in which a frequency response zero is introduced at the output of the error amplifier 202. For example, the LDO 104 may be a two-pole system (e.g., a pole resulting from the capacitor 218, as described above, and a pole resulting from the output of the error amplifier 202). To maintain stability of the LDO 104, compensation is provided by the compensation circuit 204 for the pole introduced at the output of the error amplifier 202. The compensation may be a frequency response zero with a location modulated according to Icomp (e.g., based on a load current of the LDO 104), in order to maintain stability of the LDO 104 across a range of load currents.

Based on Ibias_adap and/or VOUT, the adaptive bias generation circuit 212 may also provide an adaptation current (Iadp) to the dynamic bias generation circuit 214. Based on Iadp, Vref, and/or VOUT (such as responsive to undershoots or overshoots occurring in VOUT with respect to VIN), the dynamic bias generation circuit 214 may provide a dynamic bias current (Idyn) to the error amplifier 202 and the buffer 206. In at least some examples, Idyn is configured to provide current bursts to the error amplifier 202 and the buffer 206 to mitigate voltage overshoot or undershoot during load transients (e.g., at the drain of the pass FET 208). Similarly, the dynamic bias generation circuit 214 may pull down (e.g., load) the drain of the pass FET 208 via Vpull-down to decrease a value of VOUT, thereby reducing a recovery time (e.g., in some implementations to less than about 10 microseconds) and an overshoot amount responsive to an overshoot in VOUT. In at least some examples, the adaptive bias generation circuit 212 and/or the dynamic bias generation circuit 214 facilitate the transconductance of the transistor 307 tracking, or being controlled to approximately equal, the transconductance of the transistor 326, such as via one or more signals provided by the adaptive bias generation circuit 212 and/or the dynamic bias generation circuit 214.

Figure 3:
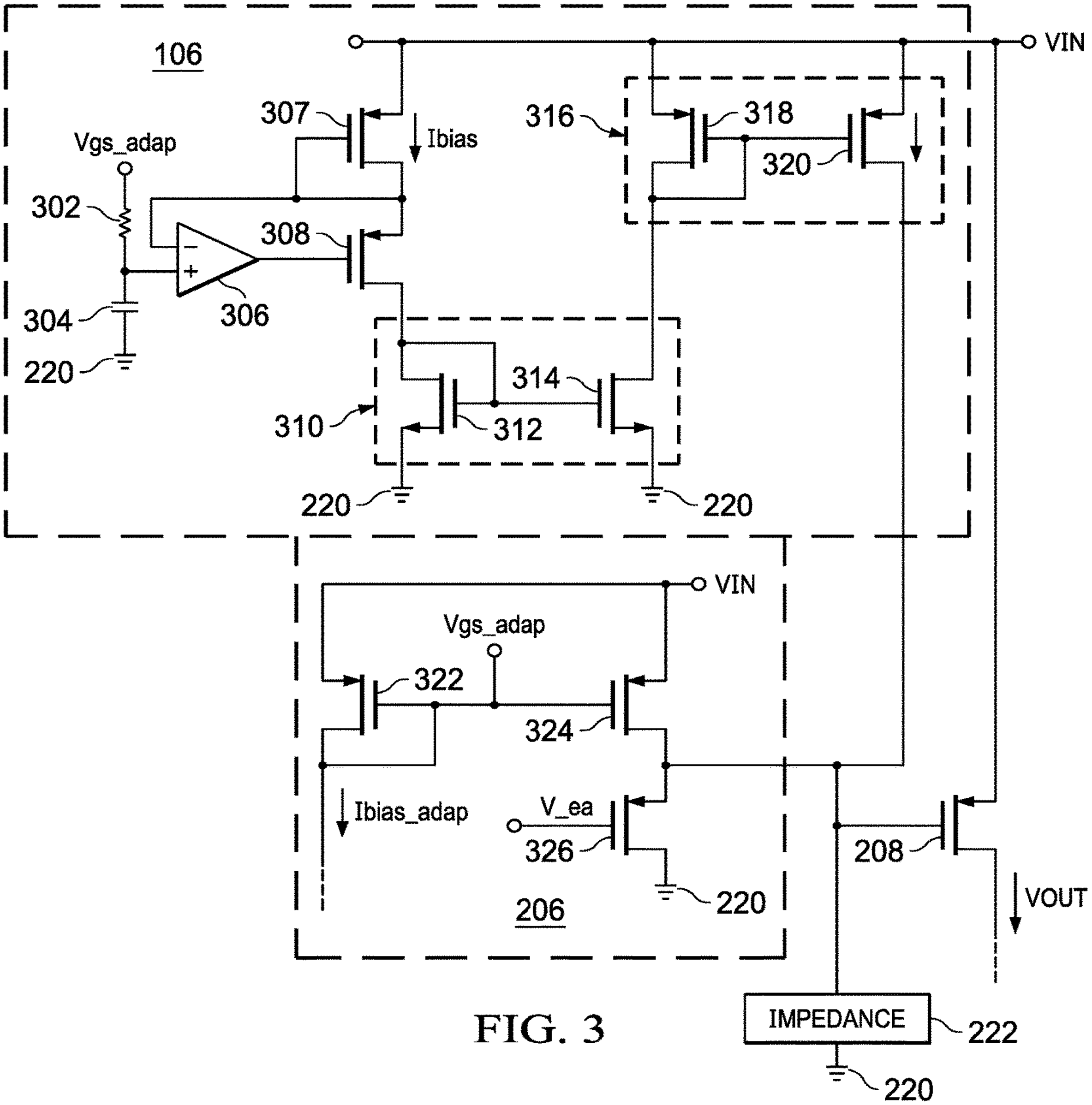
FIG. 3 is a schematic diagram of an example implementation of a portion of an LDO.

FIG. 3 is a schematic diagram of the example implementation of a portion of the LDO 104. In at least some examples, FIG. 3 is representative of a transistor-level implementation of at least a portion of the LDO 104 as shown in FIG. 2. For example, the LDO 104 as shown in FIG. 3 includes the CFFRC 106, the buffer 206, the pass FET 208, and the impedance 222. In at least some examples, the CFFRC 106 includes a resistor 302, a capacitor 304, a differential amplifier 306, a p-type FET (PFET) 307, a PFET 308, a current mirror 310 that includes a n-type FET (NFET) 312 and a NFET 314, and a current mirror 316 that includes a PFET 318 and a PFET 320. In some examples, the buffer 206 includes a PFET 322, a PFET 324, and a PFET 326.

In an example architecture of the LDO 104, the resistor 302 has a first terminal configured to receive a bias voltage Vgs_adap, and a second terminal coupled to a first input (e.g., a positive or non-inverting input) of the differential amplifier 306. The capacitor 304 is coupled between the first input of the differential amplifier 306 and ground 220. The differential amplifier 306 has an output coupled to a gate of the PFET 308. A source of the PFET 308 is coupled to a second input (e.g., a negative or inverting input) of the differential amplifier 306. A gate of the PFET 307 is coupled to the second input of the differential amplifier 306, a drain of the PFET 307 is coupled to the second input of the differential amplifier 306, and a source of the PFET 307 is configured to receive VIN. A drain of the PFET 308 is coupled to a drain and a gate of the NFET 312. Also, the NFET 312 has a source coupled to ground 220. The NFET 314 has a gate coupled to the gate of the NFET 312, a source coupled to ground 220, and a drain coupled to a drain of the PFET 318, a gate of the PFET 318, and a gate of the PFET 320. The PFET 318 and the PFET 320 each have sources configured to receive VIN. The PFET 320 has a drain coupled to, or adapted to be coupled to, the gate of the pass FET 208. The PFET 322 and the PFET 324 have respective sources configured to receive VIN. A drain of the PFET 322 is coupled to the gate of the PFET 322 and adapted to be coupled to the adaptive bias generation circuit 212, as described above. In at least some examples, the adaptive bias generation circuit 212 sinks Ibias_adap through the PFET 322. Also, the PFET 322 is diode-connected, providing the bias voltage Vgs_adap at the gate of the PFET 322, which is coupled to the gate of the PFET 320. In at least some examples, the sense FET 210 and the PFET 322 may be implemented as the same. The PFET 324 also has a drain coupled to the gate of the pass FET 208. The PFET 326 has a gate coupled to the output of the error amplifier 202 and configured to receive V_ea, a source coupled to the gate of the pass FET 208, and a drain coupled to ground 220. In at least some examples, transconductance of the PFET 307 and the PFET 326 may be matched to provide the transconductance ratio of 1, as described above.

In an example operation of the LDO 104 as shown in FIG. 2, the resistor 302 and the capacitor 304 form a low-pass filter having an output coupled to the first input of the differential amplifier 306. In at least some examples, the low-pass filter defines a cutoff frequency of the CFFRC 106 based on a resistance value of the resistor 302 and a capacitance value of the capacitor 304. In at least some examples, the cutoff frequency is about 150 Hertz (Hz), resulting from a resistance of the resistor 302 of about 100 megaohms and a capacitance of the capacitor 304 of about 10 picofarads. With the cutoff frequency of 150 Hz, the gate of the PFET 307 may be held at an alternating current (AC) ground compared to the source of the PFET 307. Through control of the PFET 308, the differential amplifier 306 may set a value for a direct current (DC) bias current (Ibias) flowing through the PFET 307. In at least some examples, the differential amplifier 306 is implemented as a 5-transistor OTA. The low-pass filter, in combination with the differential amplifier 306, may form a servo high-pass filter.

In at least some examples, because the gate of the PFET 324 is configured to receive and be biased by Vgs_adap, as is the differential amplifier 306 through the filter of the resistor 302 and capacitor 304, transconductance of the PFET 307 and the PFET 326 may be matched, thereby providing the transconductance ratio of 1 as described above. Current flowing through the PFET 307 may be determined according to g_pfet307*VIN_ripple, where g_pfet307 is the transconductance of the PFET 307, and VIN_ripple is the ripple present in VIN. Also, in at least some examples in which the impedance 222 is dominated by an output impedance of the buffer 206 (e.g., which is the impedance provided at the gate of the pass FET 208), the impedance 222 may have an approximate value determined according to 1/g_pfet326, where g_pfet326 is a transconductance of the PFET 326. V_ripple, which is the voltage ripple provided to the gate of the pass FET 208 by the CFFRC 106, is approximately equal to the current flowing through the PFET 307 multiplied by the impedance 222. Thus, by substituting the above, V_ripple is approximately equal to (g_pfet307/g_pfet326)*VIN_ripple. If g_pfet307/g_pfet326 is controlled to be 1 as described above, V_ripple becomes approximately equal to VIN_ripple.

Figure 4:
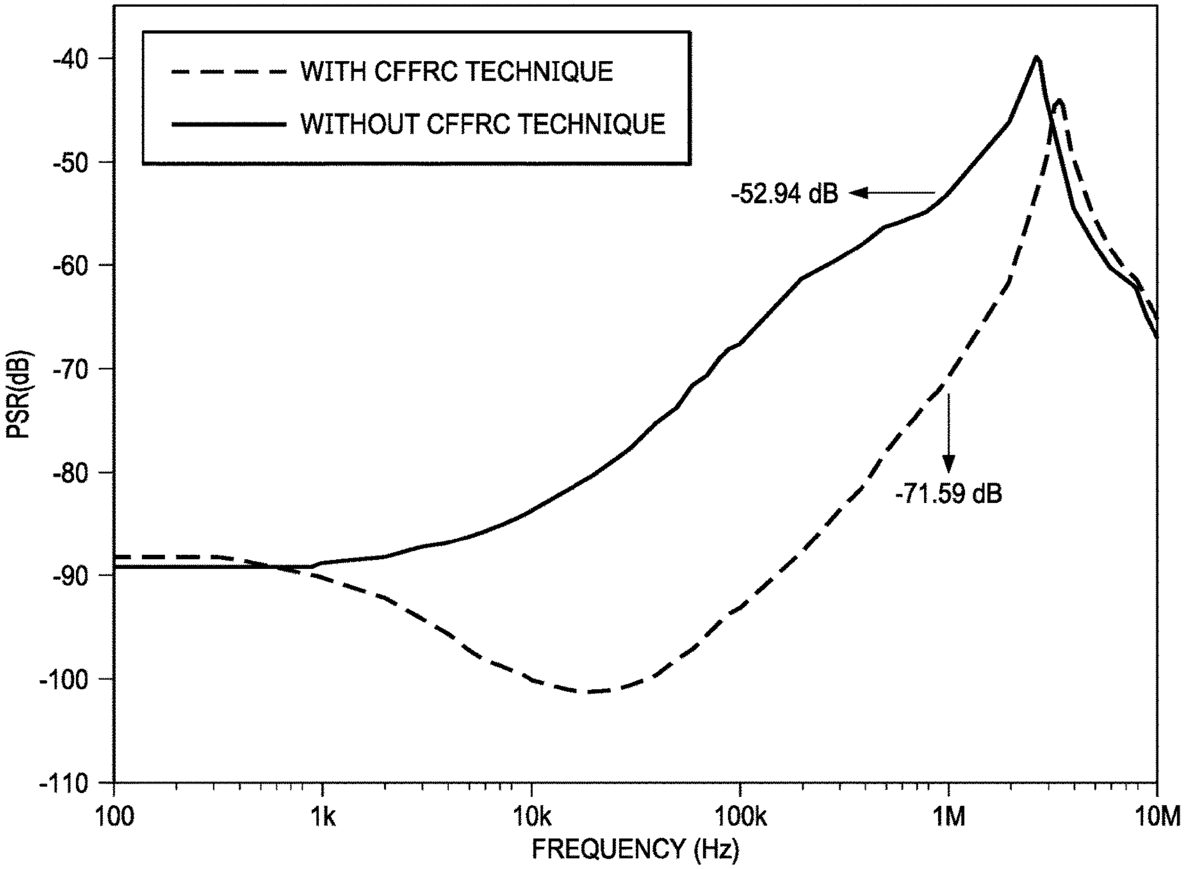
FIG. 4 is a diagram of example signal waveforms.

Providing V_ripple at the gate of the pass FET 208 with the source of the pass FET 208 receiving VIN_ripple (e.g., providing approximately VIN_ripple as common mode input to the gate and source of the pass FET 208) reduces an amount of VIN_ripple that is passed to VOUT and increases a PSR ratio of the LDO 104. FIG. 4 is a diagram 400 of example signal waveforms, which shows a comparison of PSR ratios of the LDO 104 including the CFFRC 106 versus an LDO that does not include a CFFRC 106. In the diagram 400, a horizontal axis represents frequency on a logarithmic scale in units of Hz, and a vertical axis represents the PSR on a linear scale in units of dB. As shown in the diagram 400, the CFFRC 106 provides the LDO 104 with an increased PSR ratio across a wide frequency range, when compared to an LDO that does not include the CFFRC 106.

Figure 5:
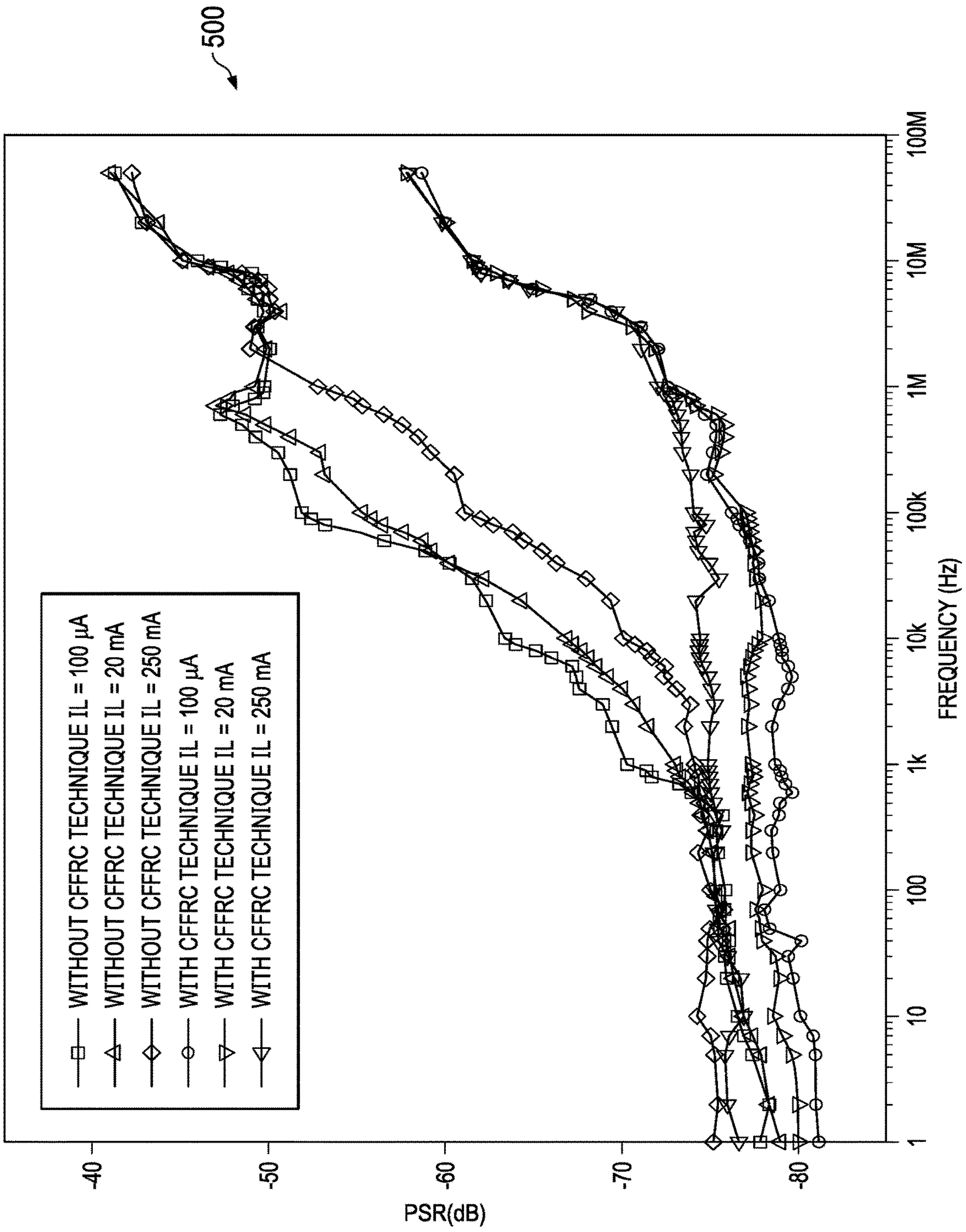
FIG. 5 is a diagram of example signal waveforms.

FIG. 5 is a diagram 500 of example signal waveforms, which shows another comparison of PSR ratios, accounting for varying load currents (shown as IL) of the LDO 104 including the CFFRC 106 versus an LDO that does not include a CFFRC 106. The waveforms of the diagram 500 assume a VIN of about 5 V, a VOUT of about 4.5 V, and a load capacitance of about 2.2 microfarads (uF). In the diagram 500, a horizontal axis represents frequency on a logarithmic scale in units of Hz, and a vertical axis represents the PSR on a linear scale in units of dB. As shown in the diagram 500, the CFFRC 106 provides the LDO 104 with an increased PSR ratio across a wide frequency range, when compared to an LDO that does not include the CFFRC 106. Also as shown in the diagram 500, the CFFRC 106 provides the LDO 104 with an increased PSR ratio across a range of load currents, in units of uA or milliamps (mA) (e.g., for load currents of 100 uA, 20 mA, and 250 mA).

Figure 6:
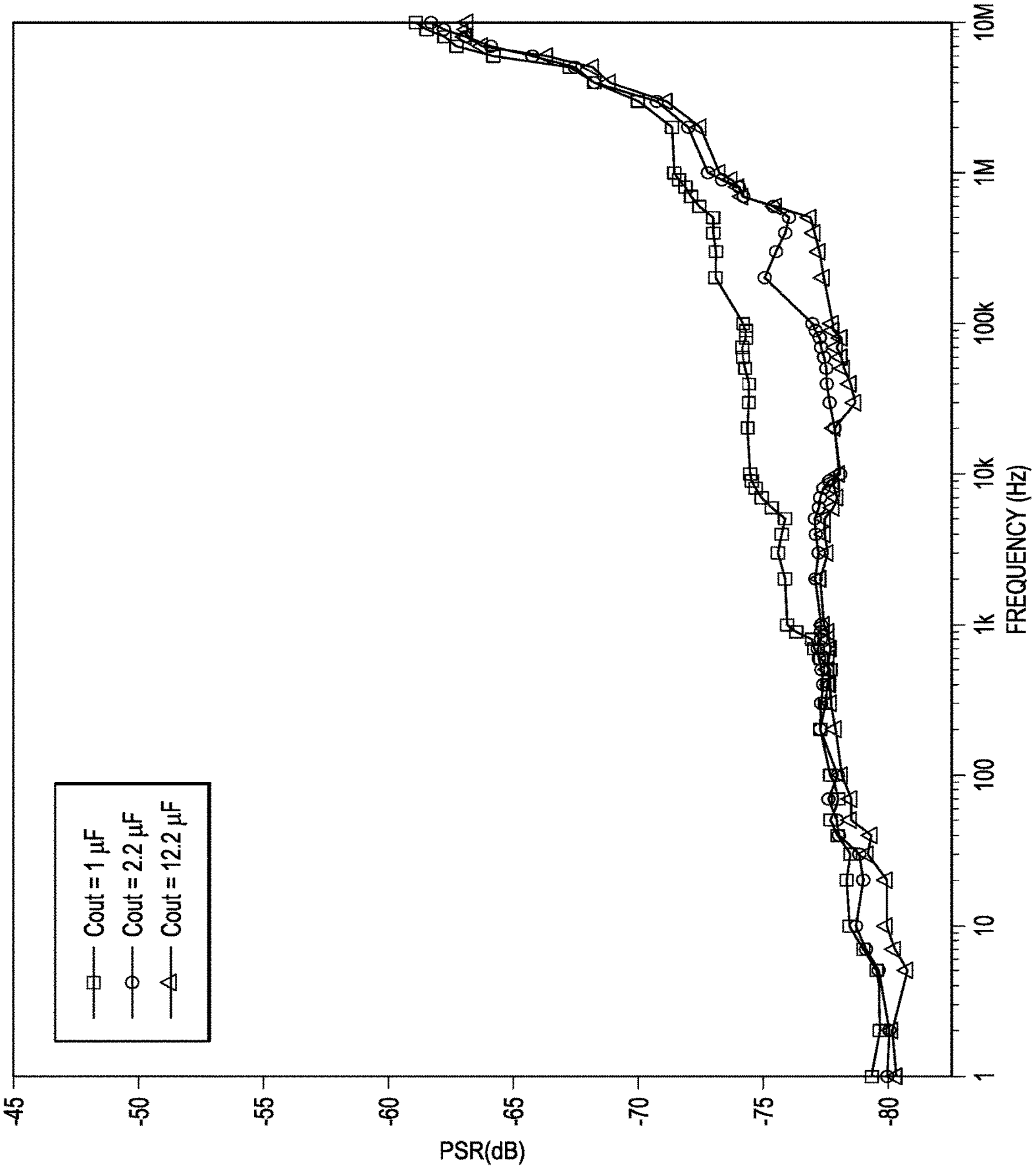
FIG. 6 is a diagram of example signal waveforms.

FIG. 6 is a diagram 600 of example signal waveforms, which shows another comparison of PSR ratios, accounting for varying output capacitances (shown as Cout) of the LDO 104. The waveforms of the diagram 600 assume a VIN of about 5 V, a VOUT of about 4.5 V, and a load current of about 20 mA. In the diagram 600, a horizontal axis represents frequency on a logarithmic scale in units of Hz, and a vertical axis represents the PSR on a linear scale in units of dB. As shown in the diagram 600, the CFFRC 106 provides the LDO 104 with a similarly increased PSR ratio across a range of output capacitances, shown for output capacitances of 1 uF, 2.2 uF, and 12.2 uF.

Figure 7:
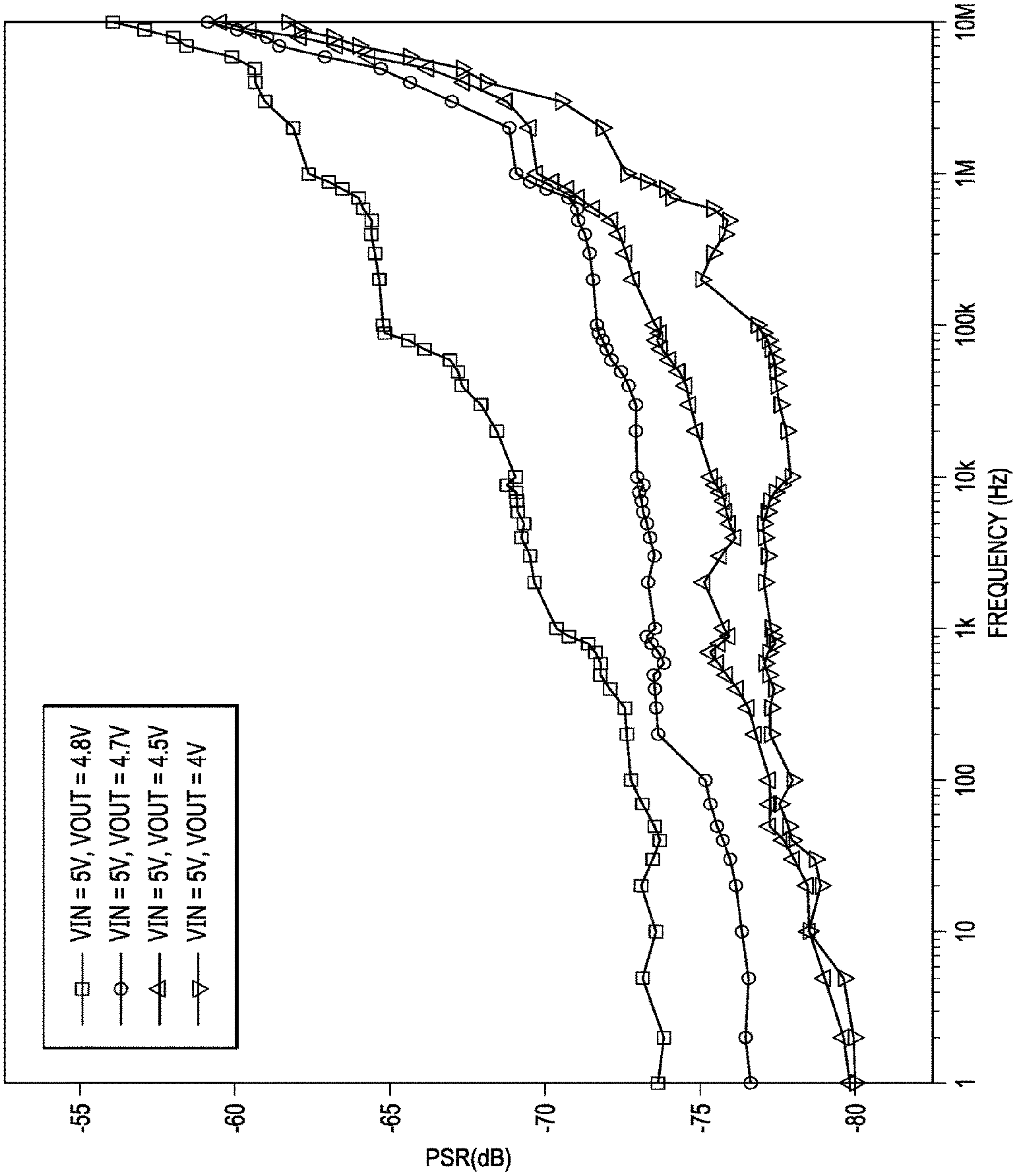
FIG. 7 is a diagram of example signal waveforms.

FIG. 7 is a diagram 700 of example signal waveforms, which shows another comparison of PSR ratios, accounting for varying values of VOUT of the LDO 104. The waveforms of the diagram 700 assume a VIN of about 5 V, a load capacitance of about 2.2 uF, and a load current of about 20 mA. In the diagram 700, a horizontal axis represents frequency on a logarithmic scale in units of Hz, and a vertical axis represents the PSR on a linear scale in units of dB. As shown in the diagram 700, the CFFRC 106 provides the LDO 104 with a similarly increased PSR ratio across a range of values of VOUT, shown for VOUT values of 4.8 V, 4.7 V, 4.5 V, and 4 V.

Figure 8A:
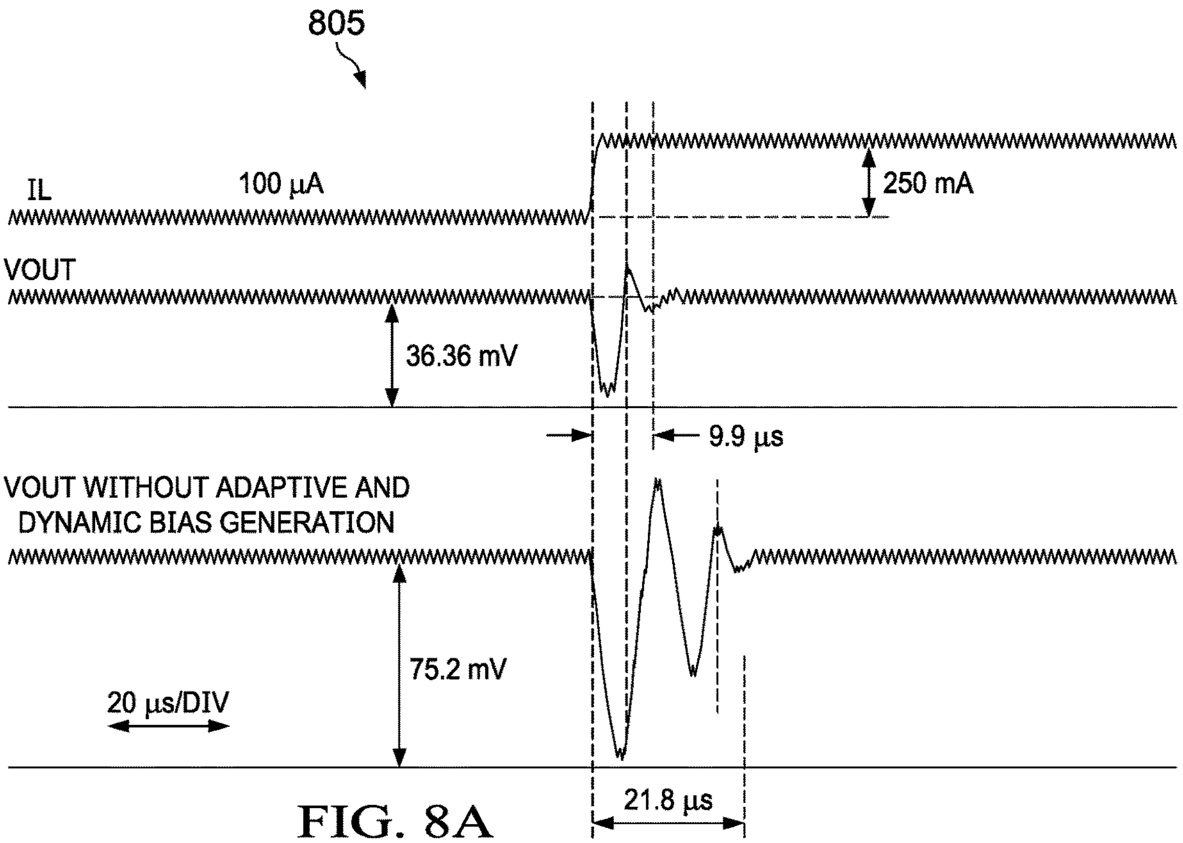
FIG. 8A is a diagram of example signal waveforms.
Figure 8B:
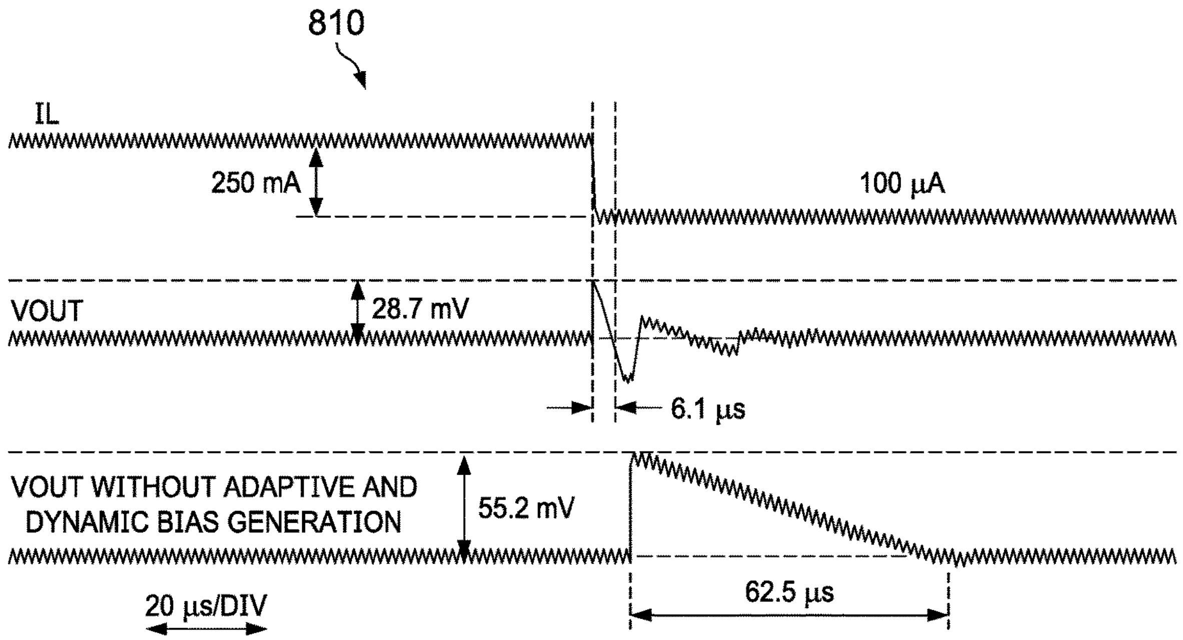
FIG. 8B is a diagram of example signal waveforms.

FIGS. 8A and 8B are diagrams of example signal waveforms. For example, FIG. 8A is a diagram 805 of load transient response of the LDO 104 for a load current step up from about 100 uA to about 250 mA. FIG. 8B is a diagram 810 of load transient response of the LDO 104 for a load current step down from about 250 mA to about 100 uA. As shown in the diagram 805 and the diagram 810, undershoot and overshoot in values of VOUT are reduced by the adaptive bias generation circuit 212 and the dynamic bias generation circuit 214, in comparison to an LDO that does not include the adaptive bias generation circuit 212 and the dynamic bias generation circuit 214. For example, by injecting current into the LDO 104, undershoots in value of VOUT are reduced (and by pulling down VOUT, overshoots in VOUT are reduced) in the LDO 104, in comparison to an LDO that does not include the adaptive bias generation circuit 212 and the dynamic bias generation circuit 214.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described herein as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described examples, and other examples are possible, within the scope of the claims.

What is claimed is:

1. A system comprising:

a power source having a power source output;

a first amplifier having a first amplifier output, first and second amplifier inputs, and an amplifier bias input, wherein the second amplifier input is coupled to a reference voltage terminal, and the amplifier bias input is configured to receive a bias current;

a buffer having a buffer input and a buffer output, wherein the buffer input is coupled to the first amplifier output;

a first transistor coupled between the first amplifier input and the power source output, and having a first control terminal, wherein the first control terminal is coupled to the buffer output;

a current-mode feedforward ripple canceller (CFFRC) having a CFFRC input and a CFFRC output, wherein the CFFRC output is coupled to the first control terminal, and the CFFRC input is coupled to the power source output, the CFFRC including:

a capacitor coupled to a ground terminal;

a resistor coupled between a bias voltage terminal and the capacitor;

a second amplifier having a second amplifier output and third and fourth amplifier inputs, wherein the third amplifier input is coupled to the capacitor and the resistor;

a second transistor coupled between the fourth amplifier input and the power source output and having a second control terminal, wherein the second control terminal is coupled to the fourth amplifier input; and a third transistor having a current terminal and a third control terminal, wherein the third control terminal is coupled to the second amplifier output, and the current terminal is coupled to the fourth amplifier input; and a load coupled to the first transistor and the first amplifier input.

2. The system of claim 1, further comprising a compensation circuit coupled to the first amplifier output.

3. The system of claim 1, wherein the resistor and capacitor are a first resistor and a first capacitor, and a second resistor and a second capacitor are coupled in series between the first transistor and the ground terminal.

4. The system of claim 1, further comprising a fourth transistor coupled between the power source output and a bias current terminal and having a fourth control terminal, wherein the fourth control terminal is coupled to the buffer output.

5. The system of claim 4, wherein the bias current terminal is coupled to an input of an adaptive bias generation circuit.

6. The system of claim 1, wherein the CFFRC includes a first current mirror and a second current mirror coupled in series between the first control terminal and the third transistor, wherein the first current mirror and the second current mirror are configured to mirror a current flowing through the third transistor.

7. The system of claim 1, wherein the buffer includes:

a fourth transistor coupled between the power source output and the first control terminal and having a fourth control terminal, wherein the fourth control terminal is coupled to the bias voltage terminal; and a fifth transistor coupled between the first control terminal and the ground terminal and having a fifth control terminal, wherein the fifth control terminal is coupled to the first amplifier output.

8. The system of claim 7, wherein the second transistor is configured to have a same transconductance as the fifth transistor.

9. The system of claim 1, wherein the CFFRC is configured to provide a current at the CFFRC output that is proportional to a ripple component of a signal at the power source output.

10. An apparatus comprising:

a first transistor having first and second current terminals and a first control terminal, wherein the first current terminal is coupled to an input voltage terminal;

a first amplifier having a first amplifier output and first and second amplifier inputs, wherein the first amplifier input is coupled to the second current terminal, the second amplifier input is coupled to a reference voltage terminal, and the first amplifier is configured to provide an error signal at the first amplifier output;

a buffer having a buffer input and a buffer output, wherein the buffer input is coupled to the first amplifier output, and the buffer output is coupled to the first control terminal;

a current-mode feedforward ripple canceller (CFFRC) having a CFFRC input and a CFFRC output, wherein the CFFRC output is coupled to the first control terminal, the CFFRC input is coupled to the input voltage terminal, and the CFFRC includes:

a capacitor coupled to a ground terminal;

a resistor coupled between a bias voltage terminal and the capacitor;

a second amplifier having a second amplifier output and third and fourth amplifier inputs, wherein the third amplifier input is coupled to the capacitor;

a second transistor coupled between the fourth amplifier input and the input voltage terminal and having a second control terminal, wherein the second control terminal is coupled to the fourth amplifier input; and a third transistor coupled to the fourth amplifier input and having a third control terminal, wherein the third control terminal is coupled to the second amplifier output;

wherein the CFFRC provides, at the CFFRC output, a current proportional to a voltage ripple on a signal at the input voltage terminal, the CFFRC being configured to increase a power supply rejection ratio (PSRR) of the apparatus, and decrease an amount of voltage ripple coupled across the first transistor; and a compensation circuit configured to provide compensation to the error signal by modulating a location of a frequency response zero in a frequency response of the error signal.

11. The apparatus of claim 10, further comprising a dynamic bias generation circuit configured to provide a bias current to the first amplifier and the buffer.

12. The apparatus of claim 11, wherein the dynamic bias generation circuit has first and second dynamic bias inputs and a bias current output, wherein the first dynamic bias input is coupled to the reference voltage terminal, the second dynamic bias input is coupled to the first transistor, and the bias current output is coupled to the first amplifier and the buffer.

13. The apparatus of claim 10, further comprising a bias circuit configured to compensate for a voltage overshoot at the second current terminal.

14. The apparatus of claim 10, wherein the CFFRC and the buffer are configured to have a same transconductance.

* * * * *